(12) United States Patent
Vissenberg et al.

(10) Patent No.: US 8,783,904 B2
(45) Date of Patent: Jul. 22, 2014

(54) MULTI-BEAM ILLUMINATION SYSTEM AND METHOD OF ILLUMINATION

(75) Inventors: Michel Cornelis Josephus Marie Vissenberg, Roermond (NL); Tim Dekker, Eindhoven (NL); Rifat Ata Mustafa Hikmet, Eindhoven (NL); Ramon Pascal Van Gorkom, Eindhoven (NL); Marcellinus Petrus Carolus Michael Krijn, Eindhoven (NL); Oscar Hendrikus Willemsen, Den Bosch (NL)

(73) Assignee: Koninklijke Philips N.V., Eindhoven (NL)

( * ) Notice: Subject to any disclaimer, the term of this patent is extended or adjusted under 35 U.S.C. 154(b) by 260 days.

(21) Appl. No.: 13/380,912

(22) PCT Filed: Jun. 17, 2010

(86) PCT No.: PCT/IB2010/052727
§ 371 (c)(1),
(2), (4) Date: Dec. 27, 2011

(87) PCT Pub. No.: WO2010/150149
PCT Pub. Date: Dec. 29, 2010

(65) Prior Publication Data
US 2012/0106151 A1    May 3, 2012

(30) Foreign Application Priority Data
Jun. 25, 2009   (EP) ..................................... 09163708

(51) Int. Cl.
*F21V 5/00*    (2006.01)
(52) U.S. Cl.
USPC ......................................... 362/244; 362/235

(58) Field of Classification Search
CPC .... H05B 33/0803; F21Y 2101/02; F21K 9/00
USPC .......... 362/244, 606, 607, 608, 609, 613, 235
See application file for complete search history.

(56) References Cited

U.S. PATENT DOCUMENTS

2003/0174499 A1    9/2003   Bohlander
2005/0122487 A1    6/2005   Koyama et al.

FOREIGN PATENT DOCUMENTS

| EP | 1696171 A1 | 8/2006 |
| GB | 2373620 A | 9/2002 |
| WO | 03077013 A2 | 9/2003 |
| WO | 2009082499 A1 | 7/2009 |

*Primary Examiner* — Vip Patel
(74) *Attorney, Agent, or Firm* — Yuliya Mathis

(57) ABSTRACT

The invention provides a multi-beam illumination system (1) for providing an illumination image (53). The multi-beam illumination system (1) has a plurality of light sources (11) with optional collimating optics (12), arranged to generate a plurality of light beams (13); a panel (30) comprising a plurality of panel segments (32) in a panel plane (35) at a first distance (d1) and arranged to contain a plurality of segment patterns (34) on the corresponding panel segments (32); and an imaging lens array (40) comprising a plurality of imaging lenses (42) in an imaging lens plane (45) parallel to the panel plane (35). Each imaging lens (42) of the imaging lens array (40) is arranged to image a corresponding segment pattern (34) of the plurality of segment patterns (34) into a respective projection image (52) of a plurality of projection images (52). The plurality of projection images (52) overlap at a predetermined image distance (Lp) and form the illumination image (53).

16 Claims, 7 Drawing Sheets

MULTI-BEAM ILLUMINATION SYSTEM AND METHOD OF ILLUMINATION

FIELD OF THE INVENTION

The invention relates to a multi-beam illumination system and a method of illumination.

BACKGROUND OF THE INVENTION

Traditionally, lighting systems have mainly been used for general illumination using white light, e.g. ceiling lighting systems using incandescent or fluorescent lighting, as well as for task lighting using white light, e.g. an incandescent or halogen spot lamp. Recently, lighting systems providing colored light have been introduced in professional and consumer markets, and these lighting systems are receiving more and more market interest, in particular for decorative purposes, as well as for e.g. creating specific atmospheres by using specific colors, but also for functional reasons. In particular, recent progress in the brightness, lumen efficacy and affordability of solid state light sources, notably light-emitting-diodes (LEDs), have made LEDs more and more suited for making professional as well as consumer lighting systems, in a wide range of applications, like color variable lamps, spotlights, LCD backlighting, architectural lighting, stage lighting, etc.

Remote-controlled color-variable LED-lamps are on the market, allowing a user to change the color and the intensity of the light beam emitted by the LED-lamp according to his wishes. The user can thus create various atmospheres by changing the color and intensity of illumination of one or more objects, e.g. a room, a wall, or parts of an area in the room such as e.g. the sitting area or specific objects in a room, such as e.g. a product on display in a shop. Such illumination may be further referred to as ambient lighting.

SUMMARY OF THE INVENTION

A disadvantage of many illumination systems of the prior art may for instance be that the known color-variable lamps, such as color-variable LED-lamps, can only generate a beam with a fixed and pre-determined beam shape, and thus a fixed and pre-determined size of the illuminated area (which may further be referred to as a "illumination image") on a surface, e.g. a wall. Therefore, such lamps do not offer the user the functionality of changing the shape of the illumination image. Another disadvantage of prior art apparatus may be that the direction of the beam is fixed, and may only be changeable by changing the orientation of the lamp itself. There may be a wish for an easier way of adjusting the direction of the beam. Furthermore, it may be found undesirable by users that known lamps can only provide one illumination image as a single-color spot at a time, i.e. when two different colors are wanted side-by-side, the user needs to use two lamps, each adjusted to an individual color, to provide the two colors.

There is a desire to be more flexible in illumination, in particular when illuminating objects or a room. It may be a further desire to provide a versatile illumination system, allowing defining and/or changing a direction and/or shape and/or pattern of an illumination image. It may be a further desire to provide a cost-efficient system. It may further be a desire to provide a thin system that may for instance be attached to a wall.

Hence, it is an object of the invention to provide an alternative lighting system, which preferably further at least partly obviates one or more of the above-described drawbacks, and which may further preferably fulfill one or more of the above indicated desires.

To achieve this, the invention provides, in a first aspect, a multi-beam illumination system (also herein indicated as "system") for providing an illumination image, the multi-beam illumination system comprising:

a plurality of light sources with optional collimating optics, arranged to generate a plurality of light beams;

a panel, arranged downstream of the light sources with optional collimating optics, the panel comprising a plurality of panel segments in a panel plane; wherein each panel segment of the plurality of panel segments is arranged to contain a respective segment pattern of a plurality of segment patterns; and wherein the plurality of light sources with optional collimating optics are arranged to illuminate the plurality of panel segments;

an imaging lens array, arranged downstream of the panel, the imaging lens array comprising a plurality of imaging lenses in an imaging lens plane arranged parallel to the panel plane at a first distance from the panel plane; wherein each imaging lens of the plurality of imaging lenses is arranged to image a corresponding segment pattern of the plurality of segment patterns into a respective projection image of a plurality of projection images, and wherein the plurality of projection images overlap at a predetermined image distance from the imaging lens plane for forming the illumination image.

The term "projection image" may especially relate to the visible effect of the imaging of the segment pattern on the projection surface. The phrase "imaging a segment pattern into a projection image" may thus relate to an optical transfer of the segment pattern to the projection surface. The projection image may be a relatively sharp image of the corresponding segment pattern, or a relatively blurred image of the corresponding segment pattern. The plurality of projection images may further be referred to as an illumination image. The illumination image may thus consist of all projection images together.

The multi-beam illumination system according to the invention may thus provide a flexible illumination system, allowing defining the projection images, and hence the illumination image, with a lot of freedom. In particular, it may allow making illumination images of different shapes and different colors, defined especially by the (color of the) light beams and the segment patterns, thus providing a light effect of a shape and/or color to an object illuminated by means of the illumination image. Different parts of the illumination image can each have their own color. These light effects can be static as well as dynamic, i.e. time-varying, depending on the type and characteristics of the panel used.

A further advantage may be that the multi-beam illumination system may not be as expensive as e.g. an LCD video projector system with a similar light output level, which could be used as an alternative to the multi-beam illumination system for projecting a projection image. However, it will generally not be required to have a system with such a large resolution as that of an LCD video projector, as ambient lighting may only require a low-resolution and somewhat blurred projection images. Also, LCD video projectors such as e.g. the LED-based projector described in US patent application US 2005/0122487, generally have an abundance of resolution, posing strong requirements on the optical performance of the projection lens in such an LCD video projector; as a result, such projection lenses are generally expensive optical arrangements of multiple lens elements for high-resolution and well-focused imaging of the LCD panel onto a projection surface. Moreover, imaging each of the panel segments with respective imaging lenses may allow the use of imaging lenses with a relatively small focal distance (e.g. compared to a situation where a single imaging lens is arranged to image a complete panel, which would require a much larger-sized single imaging lens with a much larger focal distance because of conservation of &endue), which allows a small thickness of the multi-beam illumination system.

The multi-beam illumination system may thus be able to generate a beam of ambient light of adjustable shape, size, direction, colors, and/or even patterns. Compared with conventional LCD video projectors, resolution may be sacrificed in the multi-beam illumination system (which however is not critical for projecting ambient lighting patterns) for, e.g., lumen output, flatness and/or ease of construction (cost). Hence, the plurality of projection images overlap at a predetermined image distance. This multi-beam projecting system based on lens arrays may have the additional advantage that color images can be projected as well, without using additional costly components like color LCD panels, color wheels and/or recombination cubes as used e.g. in multi-panel LCD video projectors.

The term "panel" may for instance relate to a device showing, or capable of showing, one or more patterns during use. These patterns may be arranged adjacent to one another. The panel may for instance be an LCD panel or an arrangement of GOBOs, etc. The panel may be reflective or transmissive. Further examples of panels and patterns will be given below. A pattern may e.g. correspond to a geometrical (regular or irregular) pattern, a figure or a photograph, etc. A "panel segment" may relate to a segment of a panel, i.e. a continuous part of the panel. A "segment pattern" relates to a pattern shown on a panel segment, at least during use, and is herein often indicated as "pattern".

The terms "upstream" and "downstream" relate to an arrangement of items or features relative to the propagation of light from a light generating means (here the light source, such as the LED), wherein relative to a first position within a beam of light from the light generating means, a second position in the beam of light closer to the light generating means is "upstream", and a third position within the beam of light further away from the light generating means is "downstream".

The term "items in a plane" especially indicates that the named items are arranged next to each other in a plane (which is preferably planar, but may alternatively be curved), in particular that the named items are arranged side-by-side, either immediately adjacent one another or with some spacing in between neighboring items.

The term "illuminate the plurality of panel segments" relates to illuminating at least part of each of the panel segments of the plurality of panel segments. That is to say, individual panel segments may be illuminated substantially completely, or only partly.

The term "parallel" denotes that the named items have a substantially constant spacing between the named items.

The terms "corresponding" and "respectively" are used to indicate a predominantly one-to-one relationship between a first item and a second item. For example, "each imaging lens of the plurality of imaging lenses is arranged to image a corresponding segment pattern of the plurality of segment patterns into a respective projection image of a plurality of projection images" has to be understood in the sense that each one of the imaging lenses is arranged to image predominantly one specific segment pattern into one specific projection image, whereas another one of the imaging lenses is arranged to image predominantly one other specific segment pattern into one other specific projection image.

It will be understood that, although the multi-beam illumination system is arranged so that projection images overlap at the pre-determined distance, the actual distance at which the projection images are projected, e.g. onto a projection surface, may be different than this pre-determined distance. In general, the predetermined distance may be in the range of 2-15 m but the user may of course arrange the illumination system at any desired distance from an object, such as a wall or ceiling, to be illuminated. It will furthermore be appreciated that the pre-determined distance does not need to be a single specific predetermined distance, but may alternatively correspond to a predetermined distance range. The predetermined range preferably corresponds to the range of actual projection distances that users are expected to use. Hence, the term "predetermined" may for instance include embodiments wherein during production a distance is set, but may also refer to embodiments wherein the system is adjustable by a user to provide an overlap of projection images within a pre-determined range.

The plurality of segments, and the corresponding plurality of imaging lenses, is preferably at least 4, more preferably at least 6, even more preferably at least 8, still more preferably at least 12, yet even more preferably at least 20, even more preferably at least 30, and still even more preferably at least 100. Such pluralities may allow a good compromise between performance and cost, especially in terms of brightness of the illumination image, panel cost, panel segment resolution and/or ease of design and construction.

The imaging lenses are preferably thin lenses, such as Fresnel lenses, arranged to image the plurality of panel segments into the corresponding plurality of projection images. Compared to e.g. a conventional LCD video projector, wherein the imaging lens is composed of a multiplicity of different lenses arranged to provide a high-quality (high-resolution, low-aberration) image of the LCD panel in the LCD video projector, this may be advantageous as being much more cost-effective, while providing a sufficient imaging quality for the purposes of ambient illumination.

It may be noted that the illumination image is substantially defined by the segment patterns on panel segments. The resolution and/or pattern of the illumination image may thus be predominantly defined by the segment patterns, and, in particular, need not be defined by the spatial arrangement and/or number of light sources.

Specific embodiments are described below. As will be clear to the person skilled in the art, embodiments may be combined.

In an embodiment, the first distance is adjustable. Adjusting the distance between the panel (plane) and the imaging lens array (plane) may advantageously allow adjusting e.g. the projection distance and/or the sharpness of the projection image.

In an embodiment, the multi-beam illumination system may further comprise an illumination lens array arranged downstream of the light sources with optional collimating optics and upstream of the panel, the illumination lens array comprising a plurality of illumination lenses in an illumination lens plane arranged parallel to the panel plane at a second distance from the panel plane; wherein the illumination lens array is arranged to create a plurality of illumination beams from the light beams, wherein each illumination beam is arranged to illuminate a corresponding panel segment of the plurality of panel segments.

The illumination lens array may reduce "cross-talk" between neighboring panel segments, as the array may avoid that light from a given panel segment reaches a neighboring imaging lens and results in a satellite image. Moreover, the illumination lenses may provide a well-defined positional illumination of the panel segments.

In an embodiment, the second distance is adjustable. Adjusting the distance between the panel (plane) and the illumination lens array (plane) may have the effect of changing the size of the fraction of the panel segment that is illuminated, and hence may advantageously allow adjusting in particular the effective size of the projection images, and hence of the illumination image.

In an embodiment, the light sources are light emitting diode (LED) light sources. Using LED light sources may be advantageous, as an LED light source can provide a compact and/or bright and/or efficient light source. Furthermore, a plurality of LEDs, being relatively small light sources, with preferably individual collimators may advantageously allow a thin system compared to conventional light sources. Also, use of LEDs may be advantageous, as LEDs may emit less infrared radiation than conventional light sources, thus preventing heating up of e.g. the panel, the illumination lens array and/or the imaging lens array. Alternative embodiments may however use different light sources, e.g. one or more small-size conventional UHP lamp(s) with reflector(s) as collimator(s).

In an embodiment, the plurality of illumination lenses is larger than the plurality of light sources, and the plurality of illumination lenses and the plurality of light sources are arranged to distribute the light beam of a single light source over more than one illumination lens. This may e.g. advantageously allow illuminating multiple panel segments with respective illumination beams, using light emitted by a single light source, which may be economical. Furthermore, as projection images overlap, this may improve the illumination uniformity of the illumination image. If the light beams are aligned with the illumination lenses, artefacts in the light beams could be the same for multiple projection images and add up in the illumination image. By projecting different parts of the light beam on top of each other, possible beam artefacts may be averaged out to some extent.

In an alternative embodiment, the plurality of illumination lenses is smaller than the plurality of light sources, and the plurality of illumination lenses and the plurality of light sources are arranged to distribute the light beam of multiple light sources over one illumination lens. This may advantageously improve uniformity. Furthermore, using a larger plurality of small light sources, compared to using a smaller plurality of larger light sources, may result in a thinner system.

In an embodiment, the multi-beam illumination system is arranged to allow shifting the segment pattern relative, and parallel, to the illumination lens. The term "shift" relates to positioning the segment pattern in another position in the panel plane by a translation. The multi-beam illumination system may e.g. have a controller for shifting the segment pattern over the panel, or to shift the panel itself within the panel plane. This may advantageously allow changing the effective direction of the projection beam and the position of the projection image.

In an embodiment of the multi-beam illumination system:
the imaging lenses and the illumination lenses have a substantially equal focal distance, and
the sum of the first distance and the second distance is in between 1.0 and 2.0 times the focal distance of the imaging lenses.

Preferably, the sum of the first distance and the second distance is in between 1.0 and 1.5 times the focal distance. In an embodiment, the first distance is substantially equal to the focal distance and the second distance is between 0.0 and 1.0, preferably between 0.0 and 0.5, times the focal distance. These conditions may provide a reasonable balance between quality of the projection images, overlap between adjacent projection images and/or system efficiency of the multi-beam illumination system. When also adjusting the second distance, and optionally also the first distance and/or the segment pattern, a zoom-effect may be obtained.

In an embodiment, the panel comprises an electronically operable display panel. The electronically operable display panel is preferably an LCD panel, even more preferably a grey-scale LCD panel. The electronically operable display panel is arranged to provide the panel segments with the segment patterns. The segment patterns are preferably dynamical segment patterns. The term "dynamical" relates to a time-varying behavior of the segment pattern: a dynamical segment pattern may thus be considered a sequence of a plurality of different segment patterns, which are sequentially provided on the panel. Using an electronically operable display panel may thus allow the projection image to be easily changed from one color and/or pattern to another, by changing between different static segment patterns or by using one or more dynamical segment patterns which change over time.

In a further embodiment, the electronically operated panel is arranged to displace the segment pattern relative to the corresponding panel segment. This may allow shifting the segment pattern relative, and parallel, to the illumination lens in a convenient manner. In particular, this may be effected by changing the positions of the displayed segment patterns on the electronically operated panel, and may not require a mechanical movement of the panel or panel segments. This may allow controlling the effective direction of the projection images, e.g. in order to improve the overlap of the projected patterns of all the segments. The displacing may comprise a substantially continuous displacement, i.e. a movement of the segment pattern over the associated panel segment. This may allow e.g. a moving pattern to be conveniently provided over the projection surface.

In an alternative embodiment, the panel comprises a static device, preferably selected from the group consisting of a slide and a perforated GOBO plate. The static device comprises the segment patterns. This may allow a very cost-effective system to be achieved, as it does not involve the electronic generation of segment patterns. The static device may preferably be removable from and insertable in the multi-beam illumination system, for easily changing the projection images. Thus, preferably, a plurality of static devices associated with different projection images (e.g. differently shaped and/or differently colored segment patterns) may be provided, allowing a user to choose between the different projection images by selecting a static device from the plurality of static devices and inserting the selected device in the multi-beam illumination system.

In an embodiment, the multi-beam illumination system is arranged to be expandable by the addition of at least additional light sources with optional collimating optics, to the plurality of light sources with optional collimating optics. This may advantageously allow increasing the performance, in particular the brightness or lumen output, of the system. In a further embodiment, the multi-beam illumination system is arranged to be expandable by a further addition of at least panel segments and associated imaging lenses, and preferably also associated illumination lenses.

In an embodiment, the plurality of light sources comprises at least two types of light sources, arranged to generate light beams at different wavelengths. The different wavelengths may also be referred to as different colors. Preferably, each panel segment is illuminated by light originating from one type of light source, with at least two different panel segments being illuminated with different colors respectively. This may e.g. allow the use of a black-and-white panel, wherein the color of the resulting illumination image is obtained by overlaying a plurality of monochrome projection images, each monochrome projection image contributing a color according to the color of the light generated by the associated light source. The use of such a black-and-white panel may be advantageous because of e.g. energy efficiency due to the absence of otherwise absorbing color filters on the panel, and/or because of cost. Furthermore, as the projection images may be relatively blurry, small color errors due to non-perfect overlap of the projection images may not be noticeable, or sufficiently small, and hence acceptable for a user of the multi-beam illumination system.

In an embodiment of the multi-beam illumination system:
the plurality of imaging lenses is arranged in an N×M matrix arrangement with an imaging lens pitch between adjacent imaging lenses,
the plurality of panel segments is arranged in a corresponding N×M matrix arrangement with a segment pitch between adjacent panel segments,
the segment pitch being larger than the imaging lens pitch.
This may advantageously remove, or at least reduce, overlay errors between the plurality of projection images.

In a further embodiment, the panel is arranged to adapt the segment pitch. This allows to remove, or at least reduce, overlay errors, also when the projection distance is changed.

In an embodiment, the imaging lens array is arranged to provide a global lens action. The term "global lens action" relates to the projection beams, created by the plurality of imaging lenses, being slightly convergent relative to each other, and substantially directed toward a global focal point. As a result, overlay errors between multiple projection images may be, at least partly, reduced. In particular, when the global focus point is positioned at the projection surface, overlay errors may be minimal.

In an embodiment, at least two or more segment patterns are substantially equal. In a further embodiment, all segment patterns are substantially equal. The system may thus provide a high-brightness illumination image, by overlaying multiple, substantially equal, projection images of moderate brightness.

In an embodiment, at least two panel segments of the plurality of panel segments are arranged to be illuminated by a single light beam, i.e. by one light beam generated by a single light source. This may advantageously average out brightness and/or color differences within the single light beam, as the projection images associated with the at least two panel segments may average out these differences when overlapping in forming the illumination image.

In an embodiment, all panel segments are provided as parts of a single panel. In a further embodiment, all panel segments are provided as a matrix arrangement of the parts of the single panel. The single panel may e.g. be a commercially available LCD panel with a large pixel count, and the panel segments may correspond to adjacent, preferably non-overlapping, parts of the LCD panel with a moderate pixel count. This may facilitate the provision and manipulation, e.g. displacement, of multiple segment patterns. The single panel may e.g. be an LCD panel with a panel diagonal of at least 5 inches, or approximately 12.5 cm, preferably at least 12 inches, or approximately 30 cm, or an even larger-sized panel. The single panel may e.g. be an LCD panel with a resolution of at least 640×480 pixels.

In an embodiment, all projection images are imaged into a substantially equal, predetermined direction relative to the imaging lenses. In particular, the system may be arranged to provide all projection images so as to be overlapping largely, especially more than 90% (at the predetermined distance). The term "overlapping more than 90%" relates to each projection image demonstrating an overlap with each other projection image of the plurality of projection images, covering an area of at least 90% of the size of each projection image. As a result, the brightness of the illumination image may be established efficiently. Also, a colored illumination image may thus advantageously be established using single-colored projection images, created from monochrome segment patterns, illuminated by respective light beams of a plurality of colors of light. In an example, the plurality of light sources comprises one or more red LEDs, one or more green LEDs, one or more blue LEDs and a transmissive black-and-white LCD panel, of which a first panel segment is illuminated by red light generated by a red LED, a second panel segment is illuminated by green light generated by a green LED, and a third panel segment is illuminated by blue light generated by a blue LED. The first panel segment is imaged into a first, red projection image, the second panel segment is imaged into a second, green projection image, and the third panel segment is image into a third, blue projection image. The red, green and blue projection images overlap, and thus compose a full-color illumination image. Other color combinations may be applied as well.

In an embodiment, the multi-beam illumination system has a thickness, a width and a height, wherein the thickness is smaller than the width and the height of the multi-beam illumination system, and preferably is smaller than 50% of the width and the height. The thickness is defined in the downstream direction of the generated light. The width and height are defined perpendicularly to the downstream direction of the generated light. The thickness may be largely determined by the dimensions of the light sources with collimating optics, the first distance, and the second distance. The first distance may be determined to a large extent by focal distances of the imaging lenses. The width and height may be largely determined by the dimensions of the panel. The multi-beam alignment system may advantageously have a relatively small thickness compared to e.g. a LCD video projector: the use of multiple imaging lenses, arranged side-by-side in an imaging lens plane for imaging a plurality of respective panel segments arranged side-by-side in a panel plane may in particular allow a much thinner system compared to systems where a single imaging lens is used for imaging the complete panel. In a further embodiment, the thickness is smaller than 8 cm, preferably smaller than 5 cm, whereas the width and height are both larger than 10 cm, preferably larger than 20 cm.

In an embodiment, the multi-beam illumination system further comprises a system controller arranged to control:
color and/or brightness of the light beam generated from the light sources for controlling the color and/or brightness of the projection images; and/or
the segment patterns provided on the panel segments for controlling e.g. the shape and position of the projection images; and/or
the first distance for adjusting the sharpness of the projection image and/or for defining the predetermined projection distance; and/or
the second distance for adjusting the size of the projection image; and/or pitches between segment patterns, pitches between the illumination lenses, and/or pitches between the imaging lenses for adjusting the overlap of projected images; and/or a lateral translation of the panel and/or of segment patterns on the panel relative to the imaging lenses and/or relative to the illumination lenses for defining and/or changing the direction of the projection images.

This may facilitate easy use of the multi-beam illumination system by a user, in particular when it is used as a flexible and volatile illumination system. This may further improve the quality of the projection image. The color may e.g. be changed depending on the time of the day, or on the presence of people. The color and/or brightness may be controlled by a controller in dependence on e.g. a sensor signal, a day and/or a time of the day, or an input of a user. The input of the user may e.g. be provided from a remote control unit operated by the user, the remote control unit being arranged to provide control signals to the controller in dependence on the input of the user to the remote control unit. The input of the user may be provided as a selection from a pre-determined plurality of pre-determined settings, or as a freely programmable setting wherein the input of the user is e.g. compiled from a plurality of settings provided by the user for e.g. the light sources and/or the segment patterns.

In a further embodiment, the multi-beam illumination system further comprises a camera, wherein:

the camera is arranged to capture a camera image of an object illuminated, or intended to be illuminated, using the multi-beam illumination system, and to determine an image detection result by analyzing the camera image; and the system controller is arranged to define the projection images in dependence on the image detection result.

Determining the image detection result may e.g. comprise recognizing a presence and/or position and/or dimensions of an object, such as a painting on a wall. Defining the projection images may then e.g. correspond to defining segment patterns on the panel and directing the projection beams towards the object, e.g. for illuminating the object and/or projecting an illumination pattern around the object. The position and/or size of the projection images may then automatically adjust when the position of the object and/or the position of the multi-beam illumination system are/is changed, without the need for a user to intervene. Alternatively, the system controller may be arranged to provide a plurality of illumination suggestions to a user, each illumination suggestion corresponding to a particular illumination image, to accept a selection made by the user from the illumination suggestions, and to define projection images in dependence on the selection.

According to yet another aspect, the invention provides the use of a multi-beam illumination system according to any one of the embodiments described above for projecting low-resolution patterns as ambient lighting, preferably by projecting the plurality of projection images onto a projection surface.

The use provides a convenient manner of defining and/or changing ambient lighting condition(s). Ambient lighting may refer to an ambience of a room, or to specific objects in the room.

According to yet another aspect, the invention provides an illumination method of providing a plurality of projection images to an object, the method comprising: generating a plurality of light beams using a plurality of light sources with optional collimating optics;

providing a plurality of segment patterns on corresponding panel segments of a panel, the panel segments being arranged in a panel plane;

illuminating the plurality of panel segments using the plurality of light beams; and imaging the plurality of segment patterns into a corresponding plurality of projection images, using an imaging lens array comprising a corresponding plurality of imaging lenses in an imaging lens plane, arranged downstream of the panel and parallel to the panel at a first distance from the panel plane, wherein the plurality of projection images overlap at a predetermined image distance from the imaging lens plane for forming the illumination image; and providing the illumination image to the object.

The object may advantageously be achieved with the plurality of projection images. The plurality of projection images may thus form an illumination image, which may contain an illumination pattern composed of the projection images from the plurality of panel-containing segment patterns. The illumination image with the illumination pattern may e.g. be projected on the object, when e.g. the object is a projection surface such as a wall or ceiling of a room, or when e.g. the object is a physical article such as a product on display in a shop. The illumination pattern may e.g. be provided around the object, e.g. when the object is a picture on a wall, the illumination pattern may correspond to a colored halo projected around the picture.

In an embodiment of the method, illuminating the plurality of panel segments using the plurality of light beams comprises:

creating a corresponding plurality of illumination beams from the light beams using an illumination lens array comprising a plurality of illumination lenses in an illumination lens plane, wherein the illumination lens array is arranged downstream of the light sources with optional collimating optics, upstream of the panel and parallel to the panel plane at a second distance from the panel plane; and illuminating the plurality of panel segments with the plurality of illumination beams, wherein each illumination beam illuminates a corresponding panel segment of the plurality of panel segments.

As described above, this may advantageously reduce crosstalk between neighboring segments. Moreover the illumination beams may advantageously define which part of the panel segments are effectively imaged, as the illuminated parts are effectively imaged while non-illuminated, dark parts are effectively not imaged.

In an embodiment of the method, at least two or more segment patterns are substantially equal. In a further embodiment, all segment patterns are substantially equal. The method may thus provide a high-brightness illumination image, by overlaying multiple, substantially equal, projection images of moderate brightness According to another aspect, the invention provides an illumination method using a multi-beam illumination system according to any one of the embodiments described above. The method may provide a convenient manner of defining and/or changing the projection image in illumination.

According to yet another aspect, the invention provides a panel for use with a multi-beam illumination system according to any one of the embodiments described above, the panel comprising a plurality of panel segments arranged to contain, at least during use of the multi-beam illumination system, a plurality of segment patterns on the corresponding panel segments. In an embodiment, the plurality of panel segments is at least 4, preferably at least 6, more preferably at least 8, even more preferably at least 12, yet even more preferably at least 20, still more preferably at least 30, even more preferably at least 100.

In an embodiment, the panel is a panel with a panel diameter of at least 7 inches (or 17.8 cm), preferably at least 15 inches (or 38 cm).

In an embodiment, the panel comprises an electronically operated display panel, preferably an LCD panel, even more preferably a grey-scale LCD panel, which is preferably arranged to provide the panel segments with dynamical segment patterns.

In a further embodiment, the electronically operated panel is arranged to displace the segment pattern relative to the associated panel segment.

In an alternative embodiment, the panel comprises a static device, preferably selected from the group consisting of a slide and a perforated GOBO plate.

Advantages of the panel and the embodiments of the panel according to the invention will be clear from the description above.

Throughout this document, the terms "blue light" or "blue emission" especially relate to light having a wavelength in the range of about 410-490 nm. The term "green light" especially relates to light having a wavelength in the range of about 500-570 nm. The term "red light" especially relates to light having a wavelength in the range of about 590-680 nm. The term "yellow light" especially relates to light having a wavelength in the range of about 560-590 nm. The term "light" herein especially relates to visible light, i.e. light having a wavelength selected from the range of about 380-780 nm.

Unless indicated otherwise, and where applicable and technically feasible, the phrase "selected from the group consisting" of a number of elements may also refer to a combination of two or more of the enumerated elements.

Terms like "below", "above", "top", and "bottom" relate to positions or arrangements of items which would be obtained when the multi-beam illumination system was arranged substantially flat on a substantially horizontal surface with the lighting system bottom face substantially parallel to the substantially horizontal surface and facing away from a ceiling and into a room. However, this does not exclude the use of the multi-beam illumination system in other arrangements, such as against a wall, or in other, e.g. vertical arrangements.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
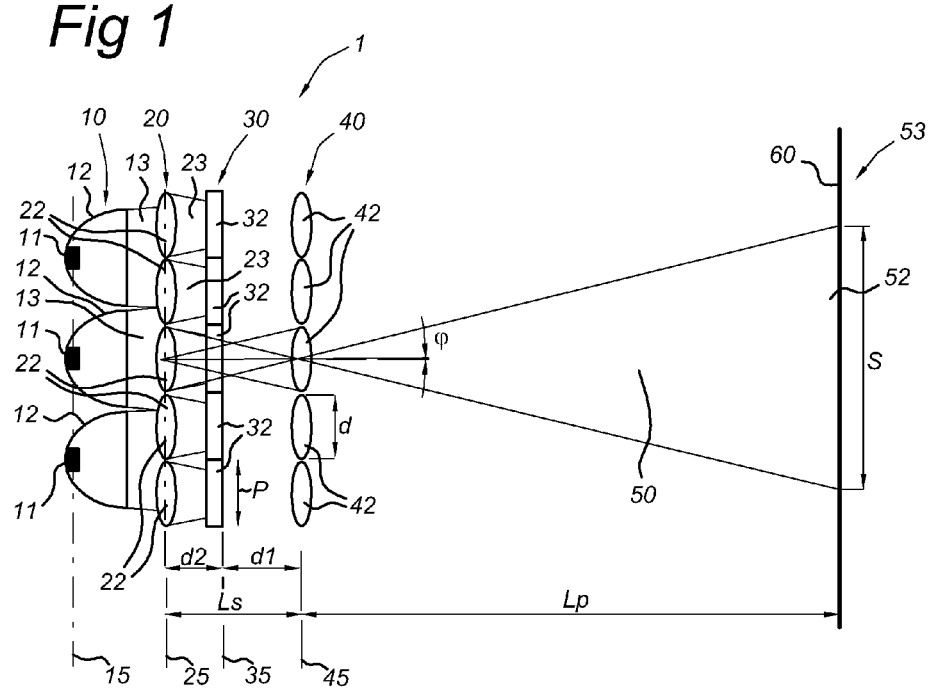
FIG. 1 schematically depicts an exemplary embodiment of a multi-beam illumination system according to the invention.

FIG. 1 schematically depicts an exemplary embodiment of a multi-beam illumination system 1 according to the invention. The multi-beam illumination system 1 is arranged at a projection distance Lp from a projection surface 60. The projection distance Lp may also be referred to as "image distance". The multi-beam illumination system 1 has an array 10 of light sources 11 with collimating optics 12. More specifically, the embodiment shown in FIG. 1 has a LED array 10 of LED light sources 11 with collimating optics 12. Alternative embodiments may use alternative types of light sources, such as e.g. incandescent lamps, discharge lamps or lasers. However, in the description below, we will refer to LED light sources and LED light beams, in order not to obscure the description. The collimating optics 12 comprises collimator lenses and/or mirrors. The collimating optics 12 may be absent in alternative embodiments, and will thus further be referred to as optional collimating optics 12. During operation, the LED array 10 generates a plurality of LED light beams 13 with substantially equal opening angles, which light beams are directed to illuminate at least parts of panel segments 32 of a panel 30. The panel segments 32 are arranged in a plane 35, which will further be referred to as panel plane 35. In the example shown, the panel segments 32 are spaced at a pitch P. The panel 30 is shown as a transmissive panel, but in an alternative embodiment, the panel 30 may be a reflective panel and associated additional optics may be provided for suitably directing the light to and away from the reflective panel.

The multi-beam illumination system 1 as shown in FIG. 1 further has an illumination lens array 20 of illumination lenses 22 in between the LED array 10 (which is upstream of the illumination lens array 20) and the panel 30 (which is downstream of the illumination lens array 20). The illumination lenses 22 are arranged in a plane 25, which will further be referred to as illumination lens plane 25. The illumination lens array 20 is preferably illuminated with a substantially parallel LED light beam 13 using the collimating optics 12. The illumination lenses 22 are arranged to shape the LED light beams into a plurality of illumination beams 23 for illuminating the plurality of segments 32, thus defining the parts of the plurality of segments 32 that are effectively imaged onto the projection surface 60. In an alternative embodiment, the illumination lens array 20 is absent, and the illumination of the plurality of segments 32 is directly provided by the plurality of LED light beams 13 generated by the LED light sources 11 with collimating optics 12.

The multi-beam illumination system 1 further has an imaging lens array 40 of imaging lenses 42. The imaging lenses 42 are arranged in a plane 45, which will further be referred to as imaging lens plane 45. The imaging lenses 42 are arranged to image a corresponding panel segment 32 of the plurality of panel segments 32 into a corresponding projection beam 50, for forming a projection image 52 of a segment pattern 34 on the panel segment 32 on the projection surface 60, as is shown for the middle imaging lens 42 and the middle panel segment 32 in FIG. 1. The term "multi-beam illumination system" thus refers to the plurality of projection beams 50 that are formed using the plurality of imaging lenses 42, which create the plurality of overlapping projection images 52 at the predetermined image distance Lp, from imaging the plurality of segment patterns 34, and thus compose the illumination image 53. The size of the projection image 52 is indicated by S in FIG. 1. It is noted that S, as indicated in FIG. 1, corresponds to the size of the projection image 52 when the panel 30 is located very close to the illumination lens array 30, such that the whole panel segment 32 is imaged. It will be understood that, when the panel 30 is located at a distance d2 from the illumination lens array 20, the panel segments 32 may only be illuminated partly: the effective size of the projection image 52, corresponding to the projection of the illuminated part, will then be indicated by means of S. It will be understood that, although the multi-beam illumination system 1 is arranged so as to make projection images 52 overlap at the pre-determined distance Lp (which is calculated from the projection lens array plane 45), the actual distance at which the projection beams 50 are projected onto the projection surface 60 for forming projection images 52 may differ from this pre-determined distance Lp. Also in this text, reference to the actual distance will be made with reference symbol Lp, and specific reference will be made to the pre-determined distance and/or the actual distance only where this is relevant. It will furthermore be appreciated that the pre-determined distance Lp does not need to be one specific pre-determined distance, but may alternatively correspond to a pre-determined distance range. The pre-determined range preferably corresponds to the range of actual projection distances that users are expected to use.

Various embodiments are possible: each LED 11 may be associated with a single illumination lens 22, but this is not necessarily the case. It is also possible to distribute the light from a given LED 11 over multiple illumination lenses 22, or to collect the light from multiple LEDs 11 by means of one illumination lens 22. Also, it may be advantageous to strive for homogeneous illumination of the illumination lens array 20, but this is not a necessary condition.

The projection images 52 are projected on top of each other on the projection surface 60, thus forming an illumination image 53 from all projection images 52, or from at least part of the plurality of projection images 52. Hence, an illumination image of multiple colors can be created by using different segment patterns 34 on the panel segments 32 of the panel 30, that are illuminated by differently colored light. The illumination image may thus contain an illumination pattern, composed of a plurality of images of corresponding segment patterns 34 on the panel segments 32, which are part of the corresponding projection images 52.

In FIG. 1, the distance between the imaging array 40 and the panel 30 is indicated with distance d1, the distance between the illumination array 20 and the panel 30 is indicated with distance d2, and the distance between the illumination array 20 and the imaging array 40 is indicated with distance Ls, which corresponds to Ls=d1+d2.

The plurality of LED light sources 11 with optional collimating optics 12 may be arranged side-by-side in a plane 15, which may also be referred to as the light source plane 15. The plurality of LED light sources 11 may e.g. be arranged in a first lattice arrangement, such as a square or rectangular I×J matrix or hexagonal I×J matrix of LED light sources.

The plurality of illumination lenses 22 may be arranged side-by-side in a second plane 25, which may also be referred to as the illumination lens plane, e.g. in a second lattice arrangement, such as a K×L matrix of illumination lenses. K and L may be equal to I and J respectively, with the K×L matrix being aligned relative to the I×J matrix: each illumination lens 42 is then associated with one LED light source 11. K and/or L may be larger than I and/or J, respectively, with the K×L matrix being aligned relative to the I×J matrix: the light of one LED light source 11 may then be distributed over multiple illumination lenses 22.

The plurality of panel segments 32 are arranged side-by-side in a third plane 35, which may be referred to as the panel plane, e.g. in a third lattice arrangement, such as a square, rectangular or hexagonal lattice, e.g. a N×M matrix of panel segments 32. The plurality of panel segments 32 may e.g. correspond to different parts of a single panel. N is preferably at least 2 and M is preferably at least 2. The plurality of panel segments, corresponding to the product of N×M in this matrix arrangement, is preferably at least 4, more preferably at least 6, even more preferably at least 8, still more preferably at least 12, even more preferably at least 30, and still more preferably at least 100. The plurality of panel segments are preferably parts of a single panel, e.g. a single LCD panel. The single panel may e.g. be a panel with a panel diagonal of at least 5 inches, or approximately 12.5 cm, preferably at least 12 inches, or approximately 30 cm. N and M are preferably equal to K and L.

The plurality of imaging lenses 42 is arranged side-by-side in a fourth plane 45, which may be referred to as the imaging lens plane, e.g. in a fourth lattice arrangement, such as a N×M matrix of imaging lenses 42, aligned with the N×M matrix of panel segments 32, such that each imaging lens is arranged to project a projection image 52 of a corresponding panel segment 32.

The first plane, second plane, third plane, and fourth plane may all be parallel to one another. I, K and N may be equal and J, L and M may be equal. The multi-beam illumination system 1 then forms substantially a plurality of mini-projectors, each comprising one LED 11 with optional collimating optics 12, preferably one illumination lens 22, one panel segment 32 and one imaging lens 42 for forming a plurality of (at least partly overlapping) projection images 52. In an embodiment, such a multi-beam illumination system 1 may be arranged to accommodate a further mini-projector comprising a LED 11 with optional collimating optics 12, preferably one illumination lens 22, one panel segment 32 and one imaging lens 42. This makes it possible to easily expand the multi-beam illumination system 1, in particular for increasing the total amount of lumen output of the multi-beam illumination system 1.

Figure 2:
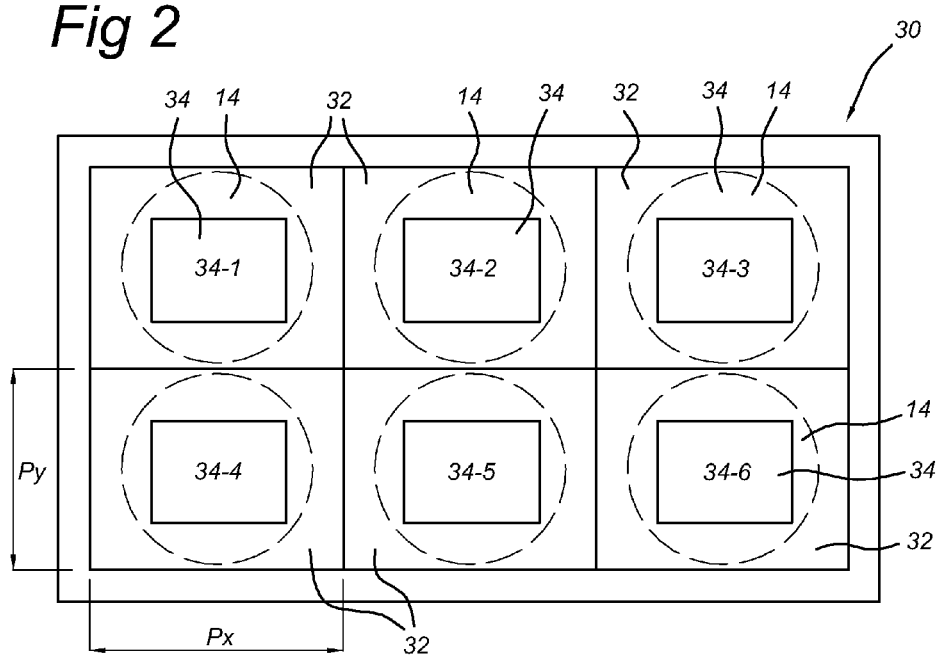
FIG. 2 schematically shows an arrangement of panel segments on the panel, according to an embodiment.

FIG. 2 shows an arrangement of panel segments 34 on the panel 30 according to an embodiment. In the arrangement of FIG. 2, the panel 30 is divided into a plurality of six panel segments 32. The plurality of six panel segments 32 is provided in a rectangular N×M matrix arrangement of N=3 columns and M=2 rows, at a column pitch Px and a row pitch Py. Segment patterns 34 are schematically drawn on each of the six panel segments 32. The segment patterns 34 are individually indicated as 34-1, 34-2, . . . , 34-6. Circles 14 indicate the cross-section of the illumination beams (13 or 23) when intersecting with the panel 30. All segment patterns 34 may be equal, resulting in an illumination image composed of six overlaying, substantially equal, projection images, and thus having a relatively high brightness compared to projection images which would result from a projector with a single LED. The segment patterns 34 may alternatively be different, in particular when at least two different panel segments 32 are illuminated with illumination beams of different colors, resulting in an illumination image composed of six overlaying projection images of different colors, thus forming a full-color illumination image.

Figure 3:
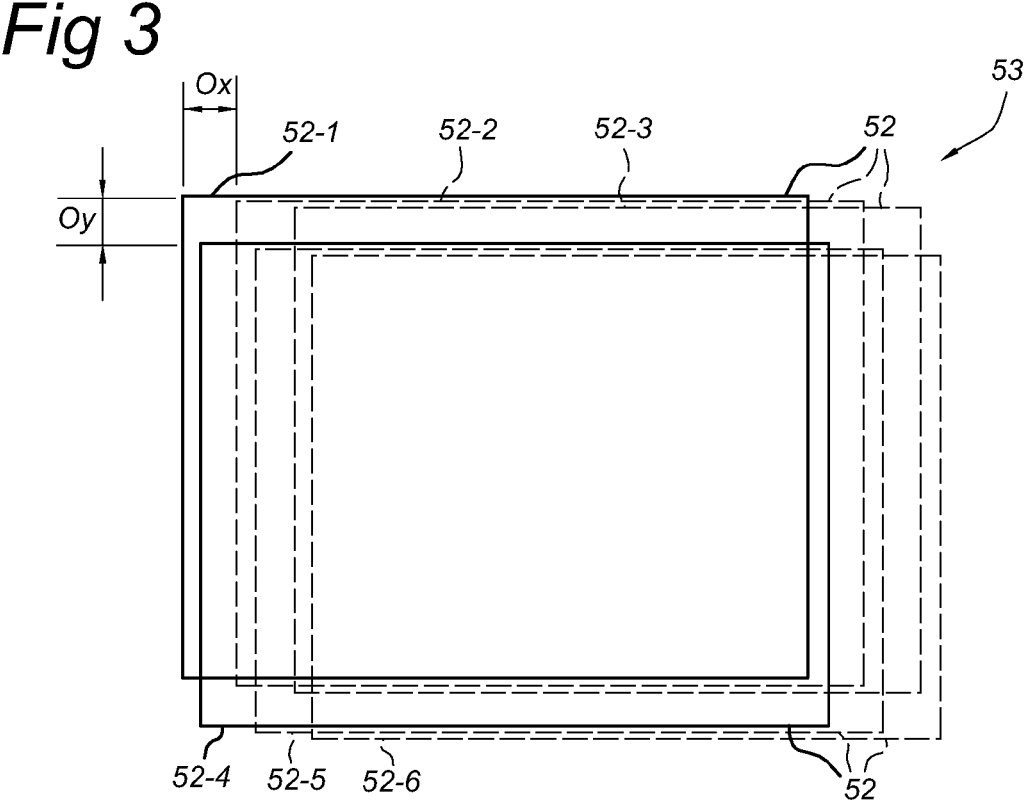
FIG. 3 schematically shows an illumination image resulting from the arrangement of FIG. 2.

FIG. 3 shows an illumination image 53, composed of the six projection images 52 resulting from the arrangement of FIG. 2. The six projection images 52 are individually indicated as 52-1, 52-2, . . . , 52-6, corresponding to the projection images associated with segment patterns 34-1, 34-2, . . . , 34-6, respectively. When the horizontal and vertical pitches between the imaging lenses 42 are the same as the column pitch Px and a row pitch Py of the panel segments 32, respectively, and the segment patterns 34 are each equally positioned relative to the corresponding panel segments 32, the six projection images 52 will overlap, with offsets Ox corresponding to column pitch Px, and Oy corresponding to row pitch Py. In the far field, these offsets may be sufficiently small compared to the size S of the projection image and the presence of such offsets may be acceptable.

The overlap may be improved, i.e. the offsets reduced, by controlling the individual projection beams e.g. by shifting the individual segment patterns 34 on the respective panel segments 32, or e.g. by shifting the imaging lens array 40 relative to the panel 30.

The offset may e.g. be corrected statically by providing the imaging lens array 40 comprising the imaging lenses 42 with a global lens action, i.e. by arranging the imaging lenses 42 such that the respective projection beams 50 converge to a global focal position.

The offset may e.g. be corrected statically by using imaging lenses 42 at a slightly smaller pitch than the pitch between the panel segments 32.

When the panel 30 is an electronically operable panel, such as an LCD panel, the offset may e.g. be electronically corrected by slightly translating the individual segment patterns 34 on the panel 30. With d denoting the pitch between the imaging lenses 42, and Lp/d1 corresponding to the image magnification factor when the imaging lenses 42 are focused on the panel 30, the pitch between the segment patterns 34 may be selected to be about d+(d1/Lp)*d for substantially removing the offset. Alternatively, with d denoting the pitch between the imaging lenses 42, and Lp/Ls corresponding to the image magnification factor when the imaging lenses 42 are alternatively focused on illumination lenses 22, the pitch between the segment patterns 34 may be selected to be about d+(Ls/Lp)*d for substantially removing the offset. The pitch between the segment patterns 34 should thus be e.g. a few percent larger than the pitch between the imaging lenses 42. The advantage is that a variable projection distance Lp can be accounted for electronically in the panel 30 by changing the pitch between the segment patterns 34 on the panel 30, instead of changing e.g. the pitch or the global lens action of the imaging lenses 42 of the imaging lens array 40.

Figure 4:
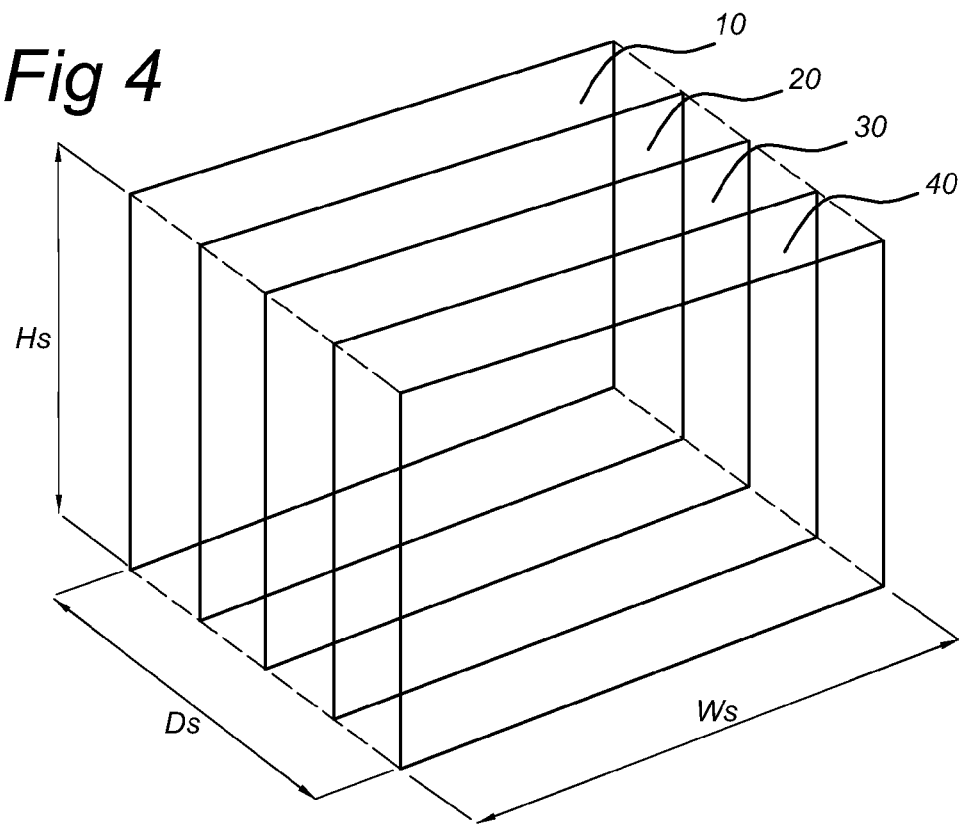
FIG. 4 schematically shows an exemplary embodiment of the multi-beam illumination system, and its dimensions, according to the invention.

FIG. 4 schematically shows an exemplary embodiment of the multi-beam illumination system 1 according to the invention.

The LED array 10, the illumination lens array 20, the panel 30 and the imaging lens array 40 are arranged in substantially parallel planes (15, 25, 35, 45; see FIG. 1) within a volume having a width Ws, a depth Ds and a height Hs. During use, the projection beams 50 preferably exit the multi-beam illumination system 1 at an angle smaller than 45° with respect to the normal of the plane of the imaging lens array 40, typically at a nominal angle of substantially 0° with respect to the normal of the plane 45 of the imaging lens array 40, or at an angle φ relative to the normal (see FIG. 6). The depth Ds is smaller than the width Ws and smaller than the height Hs.

In a first example, the multi-beam illumination system 1 is arranged to project an illumination image of approximately S=50 cm diameter at a distance Lp=2 m, using LEDs 11 with collimator optics 12 delivering a LED light beam having an opening angle of α=arctan(S/2L)=7°. A 10×10 cm LCD panel may be illuminated using 16 LEDs 11 in a 8×8 matrix arrangement of LEDs having a 1 mm×1 mm LED die size and 7° collimators 12. The width Ws and the height Hs correspond to the size of the LCD panel and are thus both 10 cm. With illumination lenses 22 and imaging lenses 42 at a pitch of 1 cm, each having focal distances of 4 cm, positioned a distance Ls from each other, equaling the focal distance, 10×10 segment patterns 34 of about 50×50 pixels at a pixel pitch of 0.2 mm can be projected. The total depth Ds of the optical system accounts for the sum of the depth of the LEDs 11 with collimators 12, which is approximately 3 cm, and the distance Ls, which is 4 cm, i.e. the total depth Ds is approximately 7 cm. The depth Ds (of 7 cm) is thus smaller than the width Ws and height Hs (10 cm each).

In a second example, the multi-beam illumination system 1 comprises a commercially available LCD panel with a panel diameter of 7 inches (or approximately 17.8 cm), a 4:3 aspect ratio and a resolution of 640×480 black-and-white pixels. The panel 30 thus has a width Ws of 14.2 cm and a height Hs of 10.6 cm. The illumination lenses 22 as well as the imaging lenses 42 have a diameter of 2.0 cm, a focal length of 4.0 cm and are arranged in a 7×5 rectangular array. The multi-beam illumination system 1 further has 150 LEDs 11 (50 red, 50 green and 50 blue LEDs) with collimator optics 12 of a thickness of 1 cm, delivering LED light beams with opening angles α=14°. It may be noted that, as the 150 LEDs are small light sources which may be closely packed, smaller collimator optics 12 of a smaller thickness than in the first example can be used. The first distance d1, between the panel 30 and the imaging lens array 40, is 4.08 cm, for imaging the segment patterns 34 on the panel segments 32 at a predetermined image distance Lp of 2.0 m. The second distance d2, between the panel 30 and the illumination lens array 20, is 0.0 cm, i.e. the illumination lens array 20 is positioned in direct contact with the panel 30, such that the panel segments 34 are substantially completely illuminated by the illumination beams 23. The total depth Ds is thus approximately 5 cm], which is approximately 35% of the width Ws and approximately 47% of the height Hs. The multi-beam illumination system 2 of this second example projects 7×5 segment patterns 34 of about 90×90 pixels at a pixel pitch of 0.22 mm on the panel 30 to an illumination image composed of 90×90 image pixels at an 11 mm pitch at the predetermined image distance of 2.0 m.

Figure 5A:
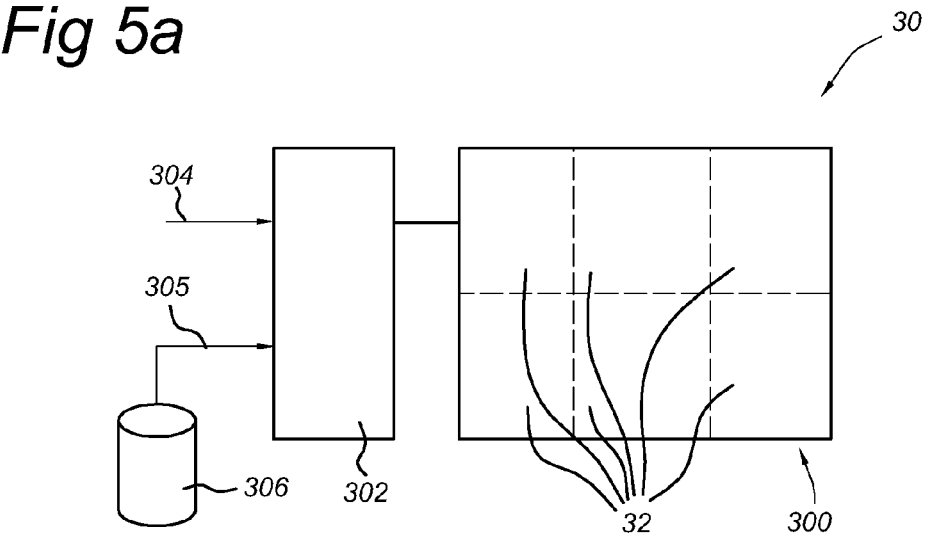
FIG. 5a-FIG. 5c schematically show exemplary embodiments of panels for use in the multi-beam illumination system according to the invention.
Figure 5B:
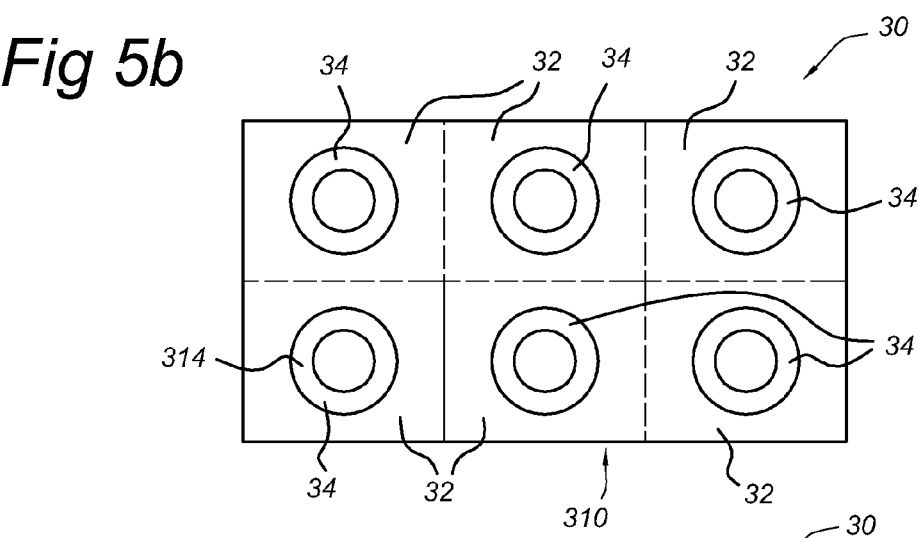
Figure 5C:
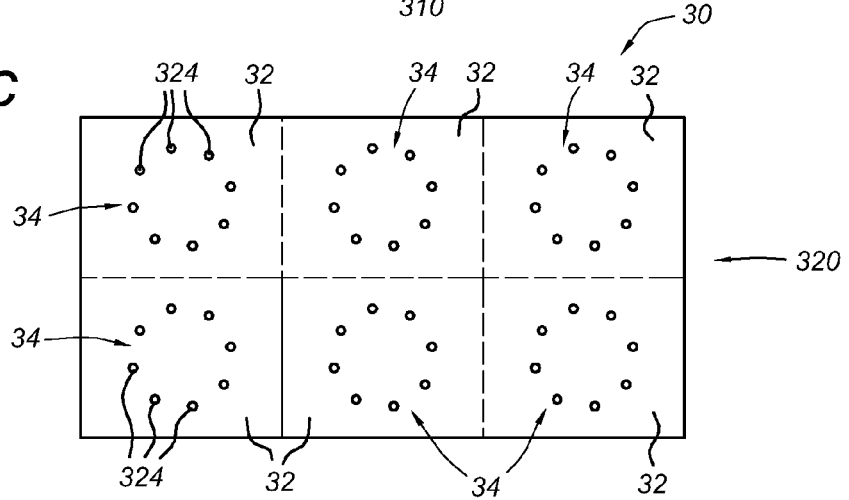

FIG. 5a-FIG. 5c schematically show different exemplary embodiments of panels 30 for use in the multi-beam illumination system 1 according to the invention.

FIG. 5a shows a panel 30 comprising an electrically controllable panel 300, such as a LCD panel. The panel 30 is operated from a controller 302, electrically connected to the panel 300, for displaying an image on the panel 300. The image may correspond to the plurality of segment patterns 34 on the corresponding plurality of panel segments 32. The controller 302 is arranged to receive control commands and/or data defining the image over an input 304. The controller 302 is optionally connected to a memory 306 via an interface 305, allowing the retrieval of pre-stored data defining one or more pre-defined images. The controller may further be equipped to store data received over the input 304 in the memory 306, so as to be able to retrieve one or more pre-loaded images during subsequent use. The input 304 may be connected to a camera (not shown), arranged to capture a camera image and to determine an image detection result from analyzing the camera image. The image detection result may be provided via the input 304 to the controller 302, which may e.g. retrieve one of the pre-loaded images in dependence on the image detection result.

FIG. 5b shows a panel 30 comprising a translucent slide 310, carrying the plurality of segment patterns 34, defined in this example by geometrical shapes 314, on the corresponding plurality of panel segments 32. The translucent slide 310 may be removable and insertable in the multi-beam illumination system 1. A user may e.g. have a plurality of translucent slides 310, each with different segment patterns 34, allowing the user to change between multiple illumination images. Further, the translucent slide 310 may also be arranged or arrangeable in the form of a constant loop, like a conveyor belt.

FIG. 5c shows a panel 30 comprising a GOBO-plate 320, carrying the plurality of segment patterns 34 on the corresponding plurality of panel segments 32. The segment patterns 34 are defined by holes 324 in the GOBO plate 320. The GOBO-plate 320 may be removable and insertable in the multi-beam illumination system 1. A user may e.g. have a plurality of GOBO-plates 320, each with different segment patterns 34, allowing the user to change between multiple illumination images with different illumination patterns. Optionally, the GOBO-plate 320 may be reflective, for use in a reflective system.

Figure 6:
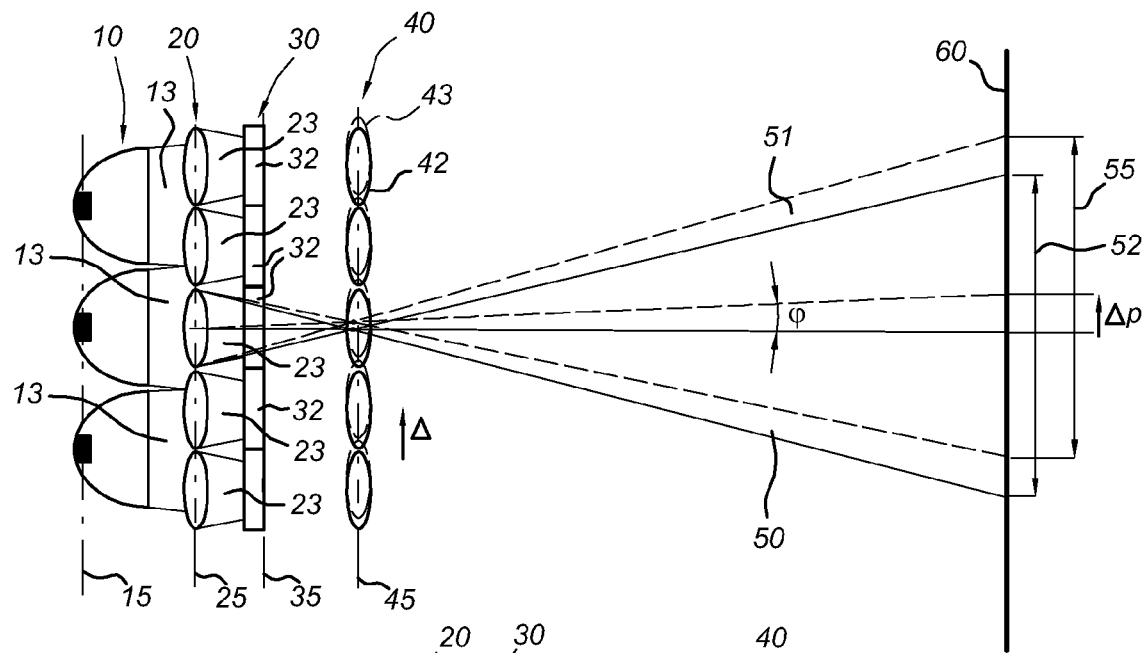
FIG. 6 schematically shows how, according to an embodiment of the invention, the direction of the projection beams may be changed.

FIG. 6 schematically shows how, according to an embodiment of the invention, the direction of the projection beams 50 may be changed.

The solid lines in FIG. 6 correspond to the arrangement and situation as shown in FIG. 1, with the imaging lens array 40 having the imaging lenses 42 at a first position relative to the panel 30, and providing projection beam 50 and projection image 52. Projection beam 50 exits the multi-beam illumination system perpendicularly to the imaging lens plane 45, i.e. at an angle of 0° degree relative to the normal to the imaging lens plane 45. The imaging lens array 40 is also shown in dashed lines 43, corresponding to the imaging lens array 40 being displaced over a distance A. A projection beam 51 and a projection image 55 shown in dashed lines correspond to the projection with the imaging lens array 40 being displaced over a distance Δ: the projection beam 51 is at an angle φ relative to the normal to the imaging lens plane, and the projection image 55 is shifted over a distance Δp relative to projection image 52.

The direction of the projection beam 50, 51 and the corresponding position of the projection image 52, 55 on the projection surface 60 can thus be changed by displacing the imaging lens array 40 in a plane parallel to the panel 30 and relative to the segment patterns 34 on the panel 30.

It will be understood that, alternatively, or additionally, the segment patterns 34 may be displaced on the panel 30, relative to the imaging lens array 40, for changing the direction of the projection beams.

Figure 7A:
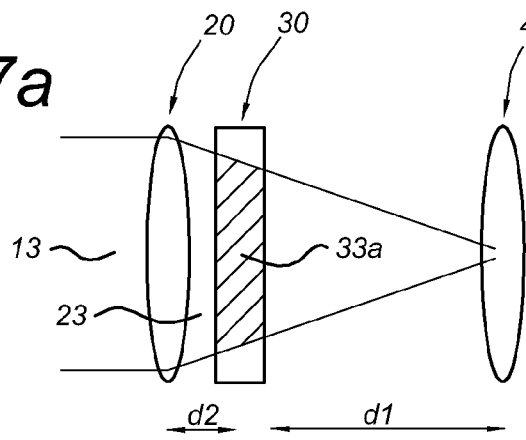
FIG. 7a and FIG. 7b illustrate adjustments according to embodiments of the invention.
Figure 7B:
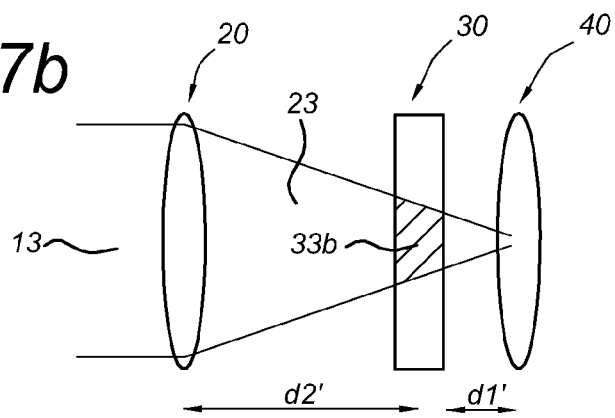

FIG. 7a and FIG. 7b illustrate that, in an embodiment, the distance d1 and/or d2 may be changed. FIG. 7a and FIG. 7b show the LED light beam 13 incident on the illumination lens array 20, thus creating a corresponding illumination beam 23 for illuminating a part (33a in FIGS. 7a and 33b in FIG. 7b) of a panel segment on the panel 30. The illuminated part 33a, 33b is then imaged into a projection beam 5, using an imaging lens 42 of the imaging lens array 40. In an exemplary embodiment, the distances d1, d2, Ls and Lp (see FIG. 1) are chosen to image the illumination lens array 20 onto the projection surface 60, using the imaging lens array 40. The panel 30 is thus not sharply imaged into the projection surface 60: this has the advantage that the projection image 52 of the segment pattern 34 is projected in a slightly blurred manner (which will further be referred to as a "degree of focus" or as "sharpness"), which provides a smooth transition between the projection image 52 and its surroundings.

The degree of focus may e.g. be adjusted by changing the first distance d1 (e.g. to d1' as shown in FIG. 7b) between the panel 30 and the imaging lens array 40. In an embodiment, the distance Ls between the illumination lens array 20 and the imaging lens array 40 is maintained constant when the first distance d2 is changed. For far-field imaging, the first distance d1 corresponds to the focal distance of the imaging lenses 42.

Likewise, changing the second distance d2 (e.g. to d2' as in FIG. 7b) between the panel 30 and the illumination lens array 20, may be used to change the size of the part of the segment 32 that is illuminated by the corresponding illumination beam 23, and thus the effective size of the projection image 52. The distance Ls between the illumination lens array 20 and the imaging lens array 40 may be maintained constant in a further embodiment. If the panel 30 is close to the illumination lens array 20, a relatively large area of the panel 30 is illuminated, as shown by means of 33a in FIG. 7a. In that case, the effective size of the projection image 52 is determined by the magnification factor of the imaging lenses 42. The effective size can be decreased by shifting the panel 30 and the imaging lens array 40 away from the illumination lens array 20: the illumination beams 23 on the panel 30 then illuminate increasingly smaller areas on the panel 30, as shown by means of 33b in FIG. 7b, until the distance is equal to the focal distance of the illumination lenses 20. In that case, the imaging lenses 42 would project point-source images, i.e. a narrow projection beam 50 with a small projection image 52 on the projection surface 60. In this limiting case, the effective size may be determined by the collimation angle of the collimators 10, defining the opening angle of the LED light beams 13 that are illuminating the illumination lens array 20.

Thus, by changing the first distance d1 between the panel 30 and the imaging lens array 40, the degree of focus may be changed, while by changing the second distance d2 between the panel 30 and the illumination lens array 20, the effective size of the projection image 52 may be changed.

In a preferred embodiment, the illumination lenses 22 and the imaging lenses 42 have an equal focal distance and the sum of the first distance d1 and the second distance d2 is in between 1.0 and 2.0 times the focal distance of the imaging lenses 42.

In an embodiment, the system 1 further comprises a controller, arranged to control one or more of d1 and Lp, preferably both. In an embodiment, the system 1 further comprises a controller, arranged to control one or more of d1 and d2, preferably both. In yet a further embodiment, the system 1 further comprises a controller arranged to control one or more of d1, d2 and Lp, preferably all three parameters.

Figure 8:
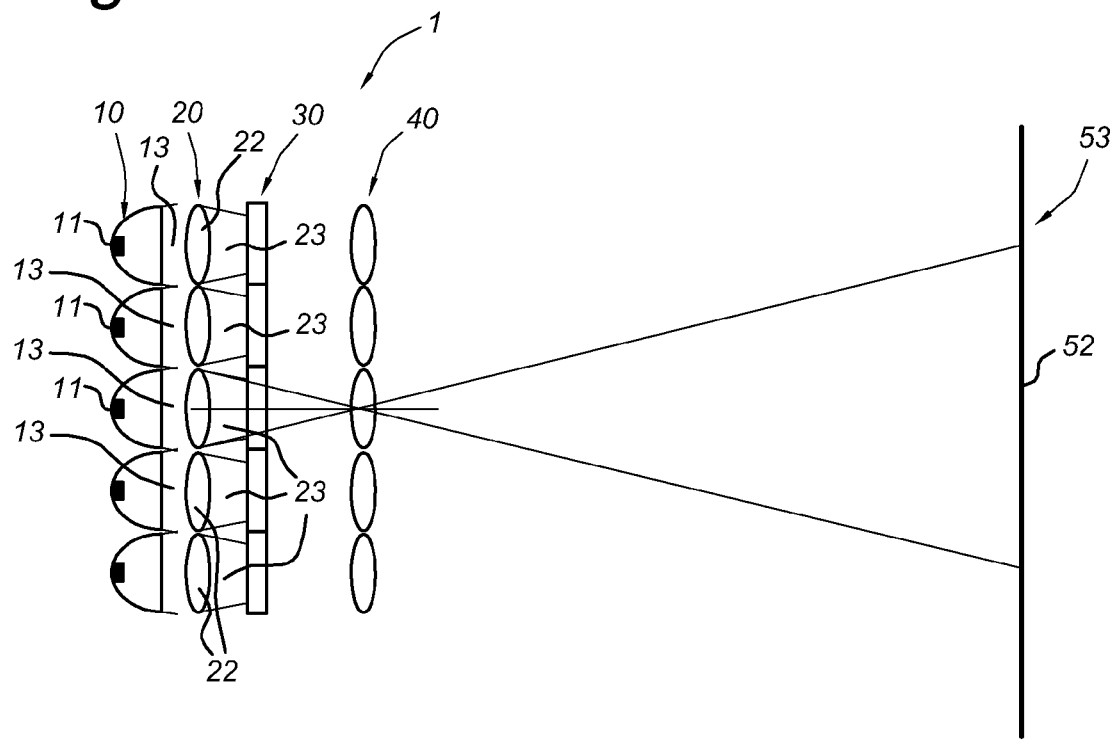
FIG. 8 shows an embodiment of a multi-beam illumination system according to the invention.

FIG. 8 shows an embodiment of a multi-beam illumination system 1 according to the invention.

The multi-beam illumination system 1 shown in FIG. 8 differs from that shown in FIG. 1, in that the number of LEDs 11 with optional collimators 12, the number of LED light beams 13, the number of illumination lenses 22, the number of illumination beams 23, the number of panel segments 32, the number of imaging lenses 42 and the number of projection beams 50 are the same. In particular, each LED 11 with optional collimating optics 12 is associated with one illumination lens 22, one panel segment 32, one imaging lens 42 and one projection beam 50. The multi-beam illumination system 1 may thus be considered as composed of a plurality of mini-projectors for forming a plurality of (at least partly overlapping) projection beams 50, wherein each mini-projector comprises one LED 11 with optional collimating optics 12, one illumination lens 22, one panel segment 32 and one imaging lens 42 for forming one projection beam 50.

In an embodiment, such a multi-beam illumination system 1 may be arranged to accommodate a further mini-projector comprising a further LED 11 with optional collimating optics 12, a further illumination lens 22, a further panel segment 32 and a further imaging lens 42. This allows easy expansion of the multi-beam illumination system 1, in particular for increasing the total amount of lumen output of the multi-beam illumination system 1.

Figure 9:
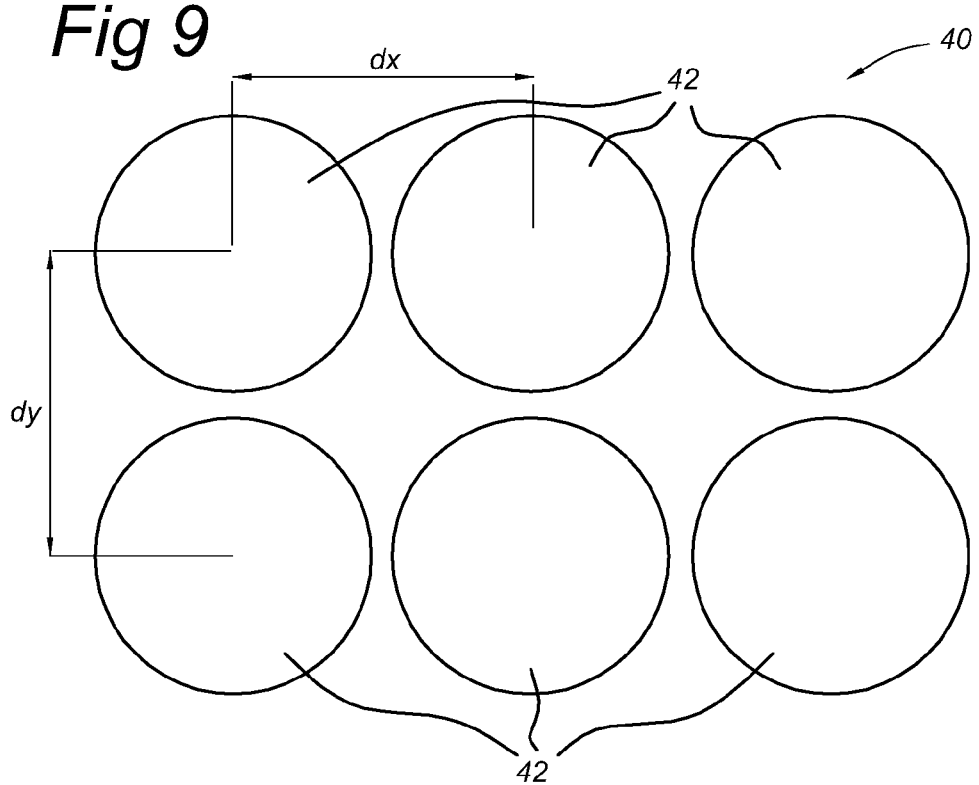
FIG. 9 shows an imaging lens array 40 for use in a multi-beam illumination system according to the invention.

FIG. 9 shows an imaging lens array 40 for use in the multi-beam illumination system 1 according to the invention. The imaging lens array 40 comprises a plurality of imaging lenses 42 arranged in a rectangular N×M matrix in a plane, which may be referred to as the imaging lens plane, with an image lens column pitch dx and an image lens row pitch dy. In an alternative embodiment, the plurality of imaging lenses 42 is arranged in a hexagonal N×M matrix in the imaging lens plane (just like the panel segments in the panel plane and the illumination lenses in the illumination lens plane). Use of a hexagonal matrix instead of a rectangular matrix may advantageously allow a closer packing of the lenses and segments, and hence an improved area efficiency. The plurality of imaging lenses 42, corresponding to the product of N×M in this matrix arrangement, is preferably at least 4, more preferably at least 6, even more preferably at least 8, still more preferably at least 12, even more preferably at least 30, and still more preferably at least 100. In the example shown in FIG. 9, N equals 2 and M equals 3, i.e. N×M=6. The imaging lenses 42 may be spherical lenses. In an embodiment, dx and dy are substantially equal and constant. In an alternative embodiment, dx and dy vary over the imaging lens array 40, with dx and dy decreasing towards the edges of the imaging lens array 40, for providing a global lens action.

The imaging lenses 42 are preferably thin lenses. The imaging lenses 42 may be thin convex lenses. The imaging lenses may be Fresnel-type lenses. The plurality of imaging lenses 42 may be provided as a plurality of discrete lenses, arranged side-by-side in a holder defining the positions of the imaging lenses in the imaging lens plane. The plurality of imaging lenses 42 may be provided as a plurality of convex lens structures applied to a transparent carrier substrate, e.g. by replication of the lens structures side-by-side on the transparent carrier substrate, effectively defining the imaging lens plane. The transparent carrier substrate may e.g. be a glass plate or a plastic plate, such as a polycarbonate or PMMA plate.

Figure 10:
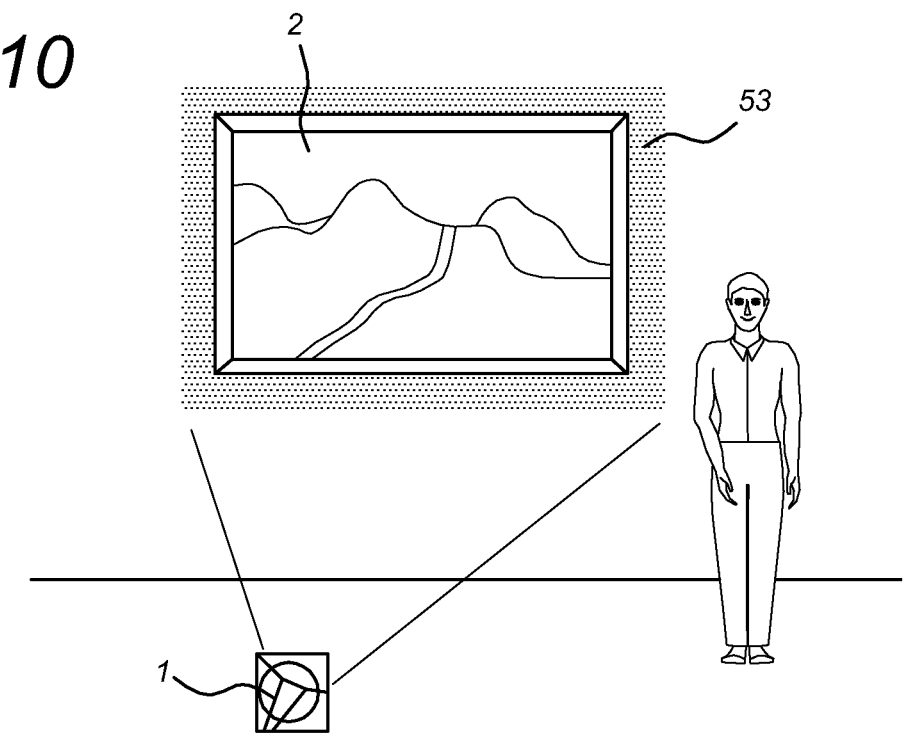
FIG. 10, FIG. 11a and FIG. 11b show uses according to embodiments of the invention.

FIG. 10 shows a use according to an embodiment of the invention. FIG. 10 shows a painting 2, hanging on a wall in a room. A colored frame 53 is projected as an illumination image around the painting, using a multi-beam illumination system 1. The color of the colored frame 53 may be chosen depending on e.g. the image shown in the painting; in particular, the color may be chosen as a dominant color of the painting, or, in another embodiment, as a complementary color of the dominant color of the painting, for enhancing a visual experience as experienced by a viewer 4. The multi-beam illumination system 1 may comprise a sensor, or cooperate with an external sensor, for detecting e.g. whether a viewer is present, and activate or deactivate the projection of the illumination image depending on whether a viewer is present or not. The multi-beam illumination system 1 may thus attract the attention of a viewer entering the room. When e.g. a plurality of paintings are in the room, successively activating and deactivating the projection of the illumination image around each of the paintings in turn may guide a viewer from one painting to the next. It will be appreciated that the use may equally apply to other items, such as other images, e.g. photographs, or three-dimensional objects, such as sculptures in a museum, or articles on display in a shop.

Figure 11A:
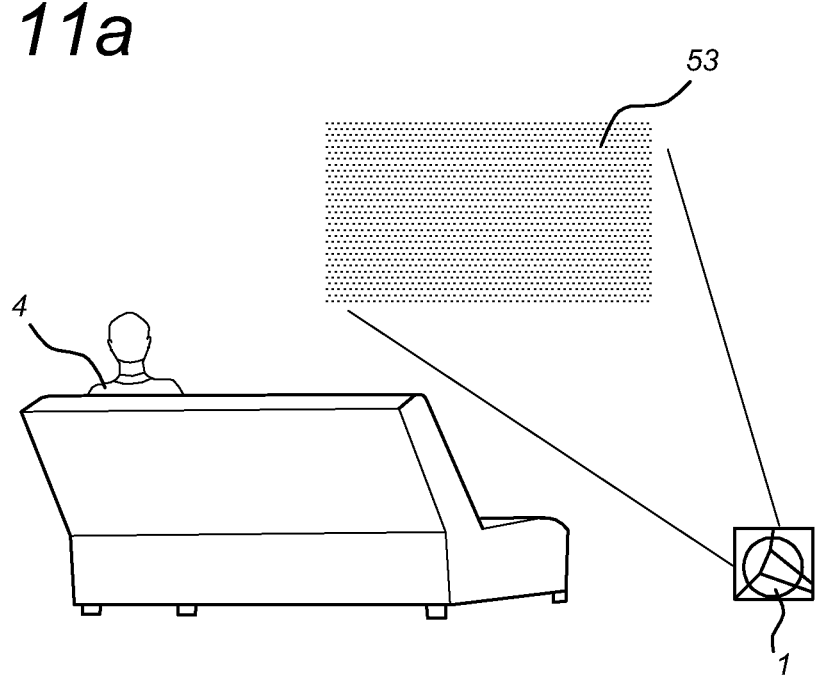
Figure 11B:
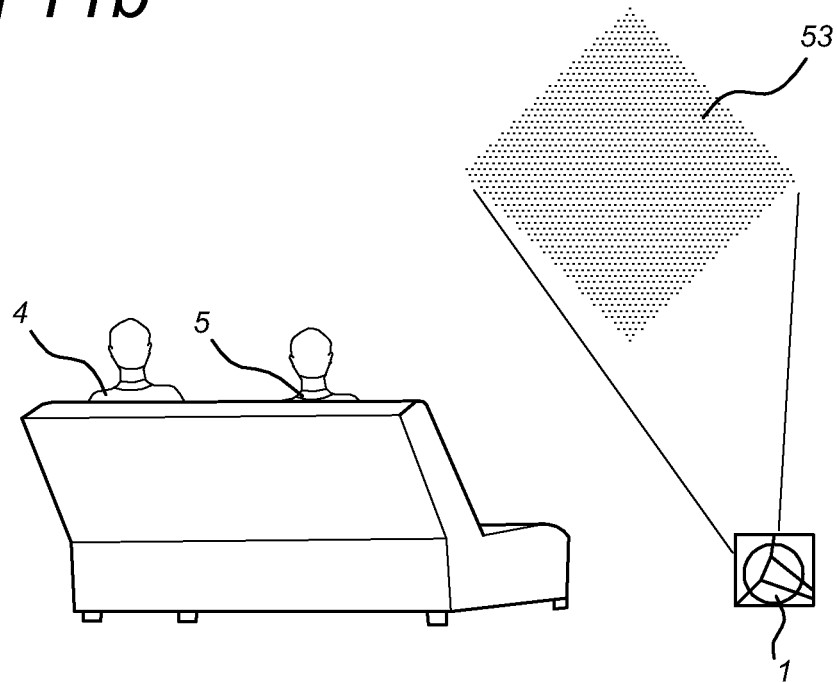

FIG. 11a and FIG. 11b show another use according to an embodiment of the invention. FIG. 11a shows a first person 4 sitting on a couch in a living room. The first person 4 has selected a specific ambient lighting condition, comprising a specific colored pattern projected using a multi-beam illumination system 1 as an illumination image 53 on the wall. The specific colored pattern may be a static pattern, or a dynamic pattern changing slowly over time e.g. in color, brightness and/or shape. FIG. 11b shows a change of the ambient lighting condition due to an external input, in this example a trigger provided by a second person 5 joining the first person 4 on the couch. The ambient lighting condition may e.g. change to another static pattern, or to another dynamic pattern for the illumination image 53. The trigger may e.g. be provided by a pressure sensor in the couch, detecting that the second person 5 sat down on the couch. The trigger may e.g. be provided by the first person pressing a button on a remote control, which signals the multi-beam illumination system 1.

In the drawings, less relevant features like electrical cables, etc. have not been drawn for the sake of clarity.

The term "substantially" used herein, such as in "substantially flat" or in "substantially consists", etc., will be understood by the person skilled in the art. In embodiments the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices used herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "and/or" includes any and all combinations of one or more of the associated listed items. The article "a" or "an" preceding an element does not exclude the presence of a plurality of such elements. The article "the" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A multi-beam illumination system for providing an illumination image, the multi-beam illumination system comprising:
   a plurality of light sources with collimating optics, arranged to generate a plurality of light beams;
   a panel, arranged downstream of the plurality of light sources with collimating optics, the panel comprising a plurality of panel segments in a panel plane;
wherein the plurality of panel segments comprises at least 4 panel segments;
wherein each panel segment of the plurality of panel segments is arranged to contain a respective segment pattern of a plurality of segment patterns; and
wherein the plurality of light sources with collimating optics are arranged to illuminate the plurality of panel segments;
an imaging lens array, arranged downstream of the panel, the imaging lens array comprising
a plurality of imaging lenses in an imaging lens plane arranged parallel to the panel plane at a first distance from the panel plane;
wherein each imaging lens of the plurality of imaging lenses is arranged to image a corresponding segment pattern of the plurality of segment patterns into a respective projection image of a plurality of projection images projected by the imaging lens array, and
wherein the plurality of projection images overlap at a predetermined image distance from the imaging lens plane forming the illumination image.

2. The multi-beam illumination system according to claim 1, wherein the first distance is adjustable.

3. The multi-beam illumination system according to claim 1, further comprising:
an illumination lens array arranged downstream of the light sources with collimating optics and upstream of the panel,
the illumination lens array comprising
a plurality of illumination lenses in an illumination lens plane arranged parallel to the panel plane at a second distance from the panel plane;
wherein the illumination lens array is arranged to create a plurality of illumination beams from the light beams,
wherein each illumination beam is arranged to illuminate a corresponding panel segment of the plurality of panel segments.

4. The multi-beam illumination system according to claim 3, wherein the second distance is adjustable.

5. The multi-beam illumination system according to claim 3, wherein:
the imaging lenses and the illumination lenses have a substantially equal focal distance, and
the sum of the first distance and the second distance is in between 1.0 and 2.0 times the focal distance of the imaging lenses.

6. The multi-beam illumination system according to claim 1, wherein the panel comprises an electronically operable display panel, arranged to provide the panel segments with the segment patterns, wherein the segment patterns are preferably dynamic segment patterns.

7. The multi-beam illumination system according to claim 1, wherein the plurality of light sources contains at least two types of light sources arranged to generate light beams at different wavelengths.

8. The multi-beam illumination system according to claim 1, comprising at least 20 panel segments and a corresponding plurality of imaging lenses and illumination lenses.

9. The multi-beam illumination system according to claim 1, wherein at least two panel segments of the plurality of panel segments are arranged to be illuminated by a single light beam.

10. The multi-beam illumination system according to claim 1, wherein all panel segments are parts of a single panel.

11. The multi-beam illumination system according to claim 1, wherein the light sources are LED light sources.

12. The multi-beam illumination system according to claim 1, wherein the predetermined image distance is in the range of 2-15 m.

13. The multi-beam illumination system according to claim 1, wherein the multi-beam illumination system has a thickness, a width and a height, wherein the thickness smaller than the width and smaller than the height of the multi-beam illumination system.

14. An illumination method of providing an illumination image to an object, the method comprising:
generating a plurality of light beams, using a plurality of light sources with collimating optics;
providing a plurality of segment patterns on corresponding panel segments of a panel, the panel segments being arranged in a panel plane;
illuminating the plurality of panel segments, using the plurality of light beams;
imaging the plurality of segment patterns into a corresponding plurality of projection images, using an imaging lens array, the imaging lens array comprising
a corresponding plurality of imaging lenses in an imaging lens plane, arranged downstream of the panel and parallel to the panel plane at a first distance from the panel plane,
wherein the plurality of projection images overlap at a predetermined image distance from the imaging lens plane for forming the illumination image; and
providing the illumination image to the object.

15. The method according to claim 14, wherein illuminating the plurality of panel segments using the plurality of light beams comprises:
creating a corresponding plurality of illumination beams from the light beams, using an illumination lens array comprising
a plurality of illumination lenses in an illumination lens plane,
wherein the illumination lens array is arranged downstream of the light sources with collimating optics, upstream of the panel and parallel to the panel plane at a second distance from the panel plane; and
illuminating the plurality of panel segments with the plurality of illumination beams, wherein each illumination beam illuminates a corresponding panel segment of the plurality of panel segments.

16. The multi-beam illumination system according to claim 13, wherein the thickness smaller than 50% of the width and 50% of the height.

* * * * *